US012772936B2

(12) United States Patent
Yabas

(10) Patent No.: US 12,772,936 B2
(45) Date of Patent: Oct. 27, 2026

(54) CARBON NEUTRAL SUSTAINABLE GROWING SYSTEM WITH ABSORPTION AND ADSORPTION MODULES

(71) Applicant: PURE IMPACT FZCO, Dubai (AE)

(72) Inventor: Huseyin Cenk Yabas, Dubai (AE)

( * ) Notice: Subject to any disclaimer, the term of this patent is extended or adjusted under 35 U.S.C. 154(b) by 0 days.

(21) Appl. No.: 18/836,774

(22) PCT Filed: Feb. 9, 2022

(86) PCT No.: PCT/IB2022/051159
§ 371 (c)(1),
(2) Date: Aug. 8, 2024

(87) PCT Pub. No.: WO2023/152541
PCT Pub. Date: Aug. 17, 2023

(65) Prior Publication Data

US 2025/0386772 A1 Dec. 25, 2025

(51) Int. Cl.
*A01G 9/24* (2006.01)
*F25B 15/06* (2006.01)

(52) U.S. Cl.
CPC ............. *A01G 9/246* (2013.01); *A01G 9/243* (2013.01); *F25B 15/06* (2013.01)

(58) Field of Classification Search
CPC ........... A01G 9/243; A01G 9/24; A01G 9/246
See application file for complete search history.

(56) References Cited

U.S. PATENT DOCUMENTS

| | | | | |
|---|---|---|---|---|
| 4,205,529 A * | 6/1980 | Ko | F25B 15/06 | 62/235.1 |
| 5,758,509 A * | 6/1998 | Maeda | F24F 3/1423 | 62/333 |
| 6,293,121 B1 * | 9/2001 | Labrador | F03D 5/00 | 62/304 |
| 2005/0120715 A1 * | 6/2005 | Labrador | F01K 27/00 | 60/618 |
| 2014/0166468 A1 * | 6/2014 | Hatzigiannis | C02F 1/14 | 202/185.1 |
| 2023/0366567 A1 * | 11/2023 | Fong | F24F 5/0014 | |
| 2024/0369267 A1 * | 11/2024 | Alshehri | F25B 15/008 | |

FOREIGN PATENT DOCUMENTS

| | | | | |
|---|---|---|---|---|
| CN | 113796239 A | * | 12/2021 | A01G 9/14 |
| KR | 20140018598 A | * | 2/2014 | B01D 53/26 |
| KR | 101991076 B1 | * | 6/2019 | F24D 11/003 |

* cited by examiner

*Primary Examiner* — Monica L Perry
(74) *Attorney, Agent, or Firm* — PatShegen IP; Moshe Pinchas

(57) ABSTRACT

There is disclosed a sustainable growing system for plants, comprising an absorption module and an adsorption module for cooling and dehumidifying an atmosphere of the sustainable growing system respectively, wherein by-products or outputs of the absorption module and adsorption module are completely utilized, thereby enabling an optimized atmosphere inside the sustainable growing system. The sustainable growing system is carbon neutral and results in zero waste of resources.

13 Claims, 11 Drawing Sheets

I-V Curve b) Forward Current Characteristics ($T_s$ = 25°C)

c) Temperature Characteristics ($I_F$ = 65 mA)

CARBON NEUTRAL SUSTAINABLE GROWING SYSTEM WITH ABSORPTION AND ADSORPTION MODULES

FIELD OF THE INVENTION

The present invention relates to the field of sustainable farming systems, and more particularly to a carbon neutral plant growing system with absorption and adsorption modules.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Greenhouses have been widely implemented in the past for agriculture and cultivation purposes, however showcased very high water consumption for cooling process. Data related to energy use were also observed to be high wherein greenhouses were found to consume 32 times the energy used in comparison to net houses. Also, the cooling cost in the total production cost is much higher and heavier for greenhouses resulting in increased production cost and thereby a loss of competitiveness of the local product in the market. Therefore, there is a need to improve energy and water use efficiency in the protected agriculture in hot and arid regions and to reduce the water and energy footprint as a result of agriculture in such regions.

Traditionally implemented energy generating systems for farming or cultivation arrangements have numerous drawbacks such as high costs for installation of a heating, ventilation and air conditioning (HVAC) setup, high maintenance costs, and that these systems additionally take up enormous areas or space for farming/cultivation purposes. Further disadvantages faced by traditional systems include that large acres of land or area are required for farming/cultivation, which is not always practical and feasible, increased human intervention or manual labour, which leads to plant deterioration, and expensive maintenance costs. Although systems like agrivoltaics (or agro-photovoltaics, i.e. the simultaneous use of land for both solar photovoltaic power generation and agriculture) were tried in several countries (such as Holland and Germany), this failed owing to rivalry between energy companies and farmers. Extreme weather conditions also led to the failure of this method. Further, net houses failed to support premium crops, especially during midsummer months.

Accordingly, there exists a need for a farming system, which overcomes drawbacks of traditionally employed growing techniques and/or systems.

SUMMARY OF THE INVENTION

Therefore it is an object of the present invention to develop a carbon neutral sustainable farming system, which overcomes drawbacks of traditionally employed growing techniques and/or systems.

There is disclosed a sustainable growing system for plants, comprising an absorption module and an adsorption module for cooling and dehumidifying an atmosphere of the sustainable growing system respectively, wherein by-products or outputs of the absorption module and adsorption module are completely utilized, thereby enabling an optimized atmosphere inside the sustainable growing system.

In another embodiment of the present invention, the absorption module is an absorption chiller wherein absorption cooling occurs in a single stage.

In another embodiment of the present invention, the absorption chiller comprises a generator, a condenser, an evaporator and an absorber.

In another embodiment of the present invention, a refrigerant of the absorption chiller is a mix of lithium bromide and water.

In another embodiment of the present invention, the absorption chiller is in connection with a cooling tower.

In another embodiment of the present invention, the absorption module receives heat and/or electricity from photovoltaic (PV) modules as input and releases chilled water, which is used for cooling or conditioning the atmosphere of the growing system.

In another embodiment of the present invention, the adsorption module comprises a desiccant wheel/dehumidifier and a heat transfer wheel.

In another embodiment of the present invention, the desiccant wheel is made of a polymer-based material.

In another embodiment of the present invention, the desiccant wheel is a rotating wheel coated with a sorption agent on which moisture from the atmosphere deposits.

In another embodiment of the present invention, the sorption agent is a hygroscopic agent such as silica.

In another embodiment of the present invention, the adsorption module receives heat and/or electricity from photovoltaic (PV) modules as input and releases dehumidified air, which is used for dehumidifying the atmosphere of the growing system.

In an embodiment of the present invention, humidity extracted from the atmosphere of the growing system is released outwards instead of re-processing the same.

In an embodiment of the present invention, the sustainable growing system is carbon neutral and results in zero waste of resources.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

The aspects of the proposed carbon neutral sustainable farming system, according to the present invention will be described in conjunction with FIGS. 1-7. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

Figure 1:
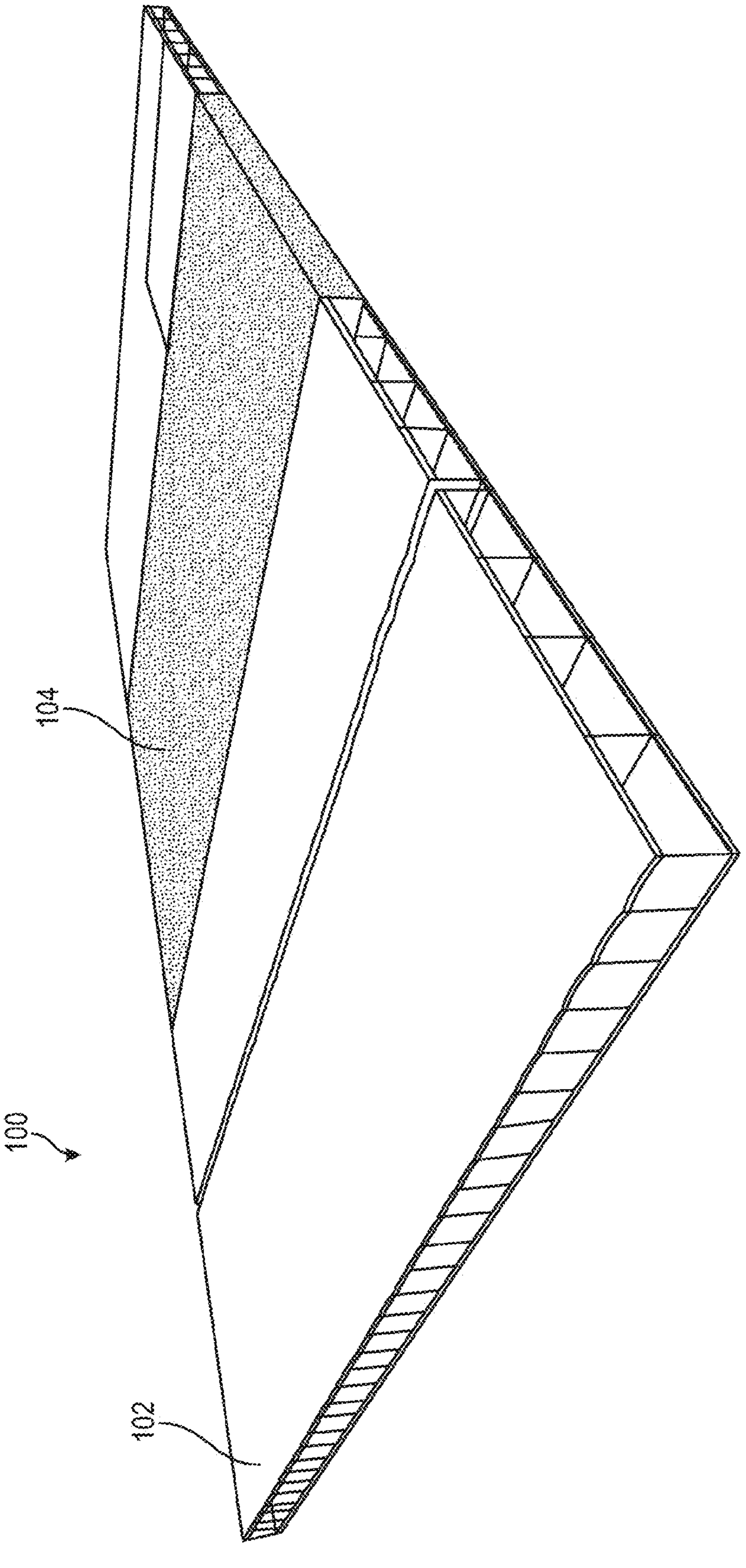
FIG. 1 depicts a hybrid net house and indoor farming system (plant factory or farm) in accordance with the present invention.

The present invention relates to a combined net house and vertical farming system 100 as depicted in FIG. 1, resulting in an system for generating and supplying energy for a vertical farming system. A net house or a shade house 102 is a structure enclosed by agro nets or any other woven material to allow required sunlight, moisture and air to pass through the gaps. It creates an appropriate environment suitable for plant growth. In accordance with the present invention, solar panels 104 are used for shading the net houses in regions with a high concentration of solar energy throughout the year (with arid and dry climates). The same solar panels 104 are used for generating energy, followed by supplying the generated energy to an indoor or vertical farming system 106. There is also provided a process and system for optimising energy efficiency while using the solar panels 104 as shades for the net houses simultaneously and according to a defined formula while being used as an energy generation source for the vertical farming system 106.

Energy generating systems traditionally implemented have drawbacks, which generally led to high costs for installation of a heating, ventilation and air conditioning (HVAC) setup, and additionally take up enormous areas or space for farming/cultivation purposes. Drawbacks faced by traditional systems include that large acres of land or area are required for farming/cultivation, which is not always practical and feasible, increased human intervention or manual labour, which leads to plant deterioration, and expensive maintenance costs. Although systems like agrivoltaics (or agro-photovoltaics, i.e. the simultaneous use of land for both solar photovoltaic power generation and agriculture) were tried in several countries (such as Holland and Germany), this failed owing to rivalry between energy companies and farmers. Extreme weather conditions also led to the failure of this method. Further, net houses failed to support premium crops (for example lettuces, tomatoes), especially during midsummer months.

As a remedy to the drawbacks faced by previously implemented systems and methods, the present invention discloses replacing the shading net of net houses 102 with a highly transparent insect net and then covering a maximum of 50% (or half) of the roof of the net house with solar panels 104, in order to achieve 50% shading.

The installed solar panels 104 are also connected directly to a plurality of LED fixtures (with matching specifications) installed in a vertical farming system—to achieve maximum electrical efficiency. The use of net houses in agriculture has many advantages, such as, but not limited to, being a passive system with no moving parts, minimum maintenance requirements, low construction and operation costs, and minimal energy requirements. Further, a net house or a shade house acts as a barrier against strong winds, while facilitating passive ventilation without the additional need of fans, and provides sufficient protection against foreign particles and possible damages from heavy rain and/or hailstorms. A net house also facilitates in diffusing incident sunlight, eliminates scorching effects, facilitates optimum photosynthesis (photosynthesis occurs as per the formula: $CO_2+H_2O=CH_4+O_2$) and stops majority of insect, while trapping humidity and providing a protective cover for the plants. With an additional misting provided in the summer, up to 7-8° Celsius of cooling effect may also be achieved with net houses. Another important advantage is the shading effect provided by net houses. Preferably, 50% shading nets are recommended in regions, which receive a high concentration of solar energy throughout the year.

Thereby, it is an objective of the present invention is to enable solar energy production by installing solar panels 104 on the roofs of net houses 102, and supplying this produced energy as a source of energy for an indoor farming system 106. In accordance with the present invention, a plurality of solar panels 104 are installed either flat on the roof of the net house 102, or in an inclined or slanted position, so as to capture solar rays-irrespective of the time of the day, and irrespective of the season (summer or winter). Accordingly, direct and diffused solar rays are efficiently captured at all times. This is highly advantageous for cultivation of premium crops such as lettuces and tomatoes, round the year (which require a daily light integral or DLI value of 24-28 mol/m2/day).

Figure 2:
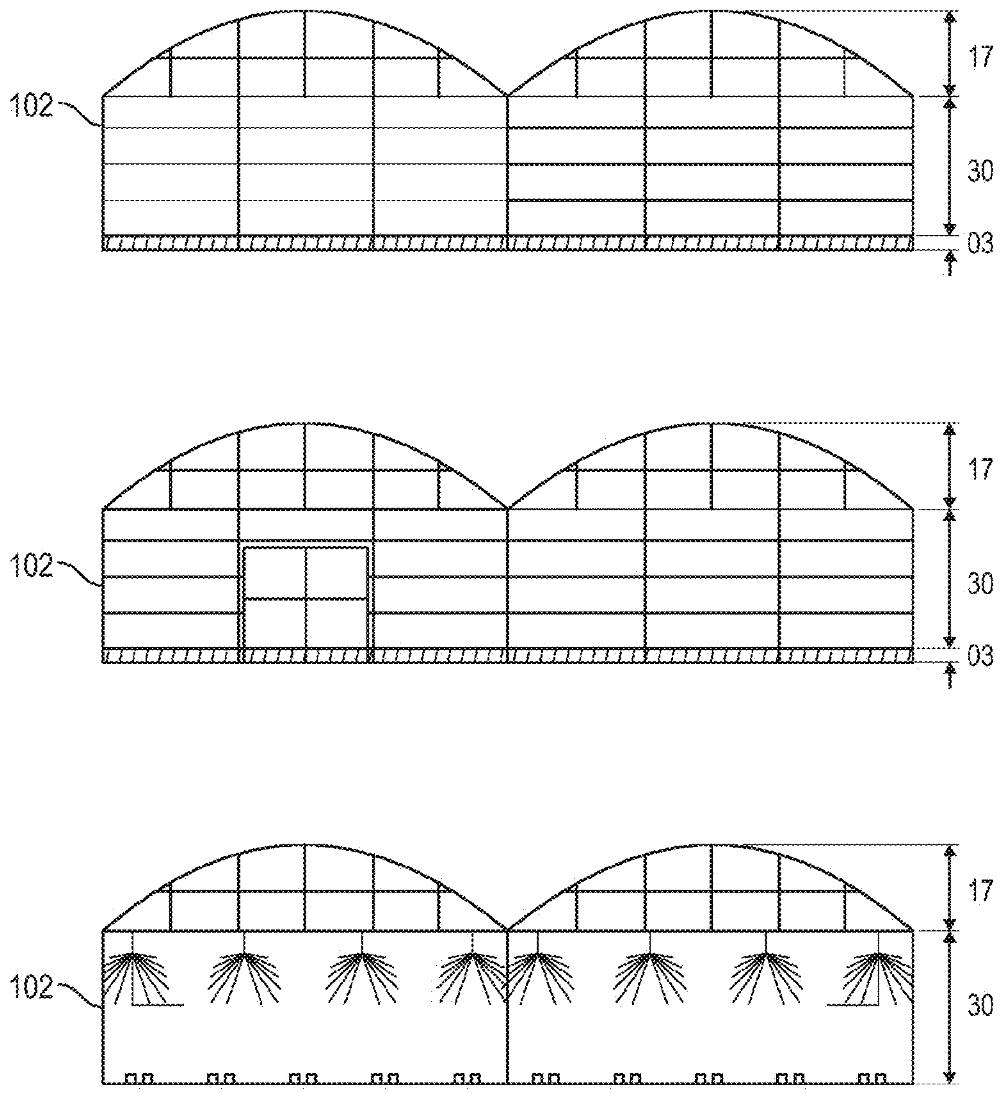
FIG. 2 shows various perspective views (back elevation, front elevation, cross section) of a net house, in accordance with the present invention.
Figure 3A:
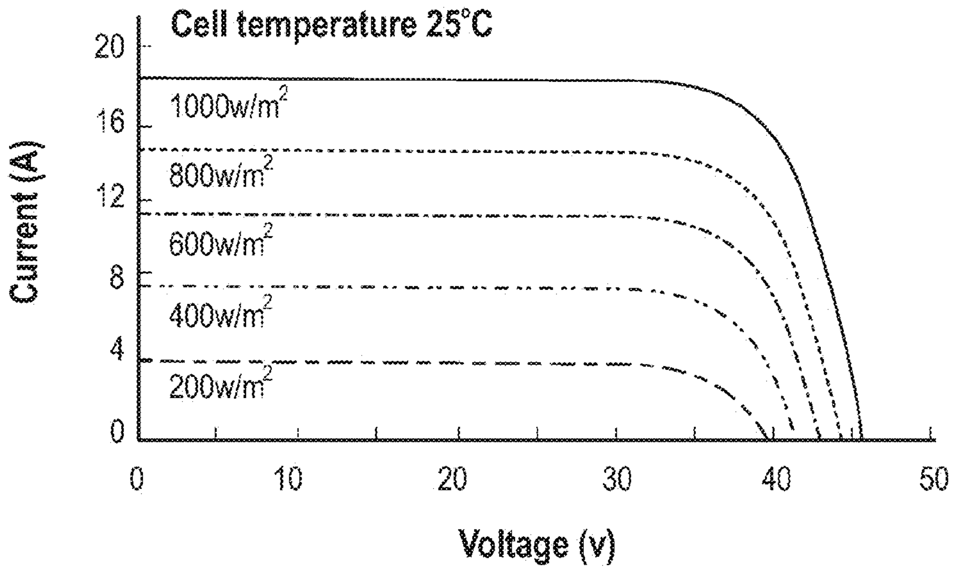
FIG. 3 (A-F) shows electrical properties of the PV panels and the LED lights (the I-V curve, forward current characteristics and temperature characteristics), in accordance with the present invention.
Figure 3B:
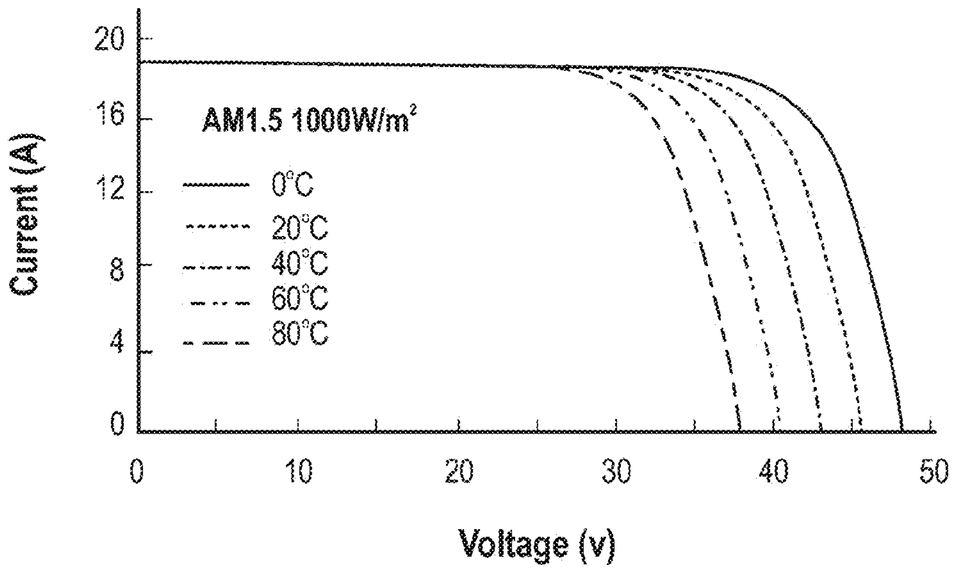
Figure 3C:
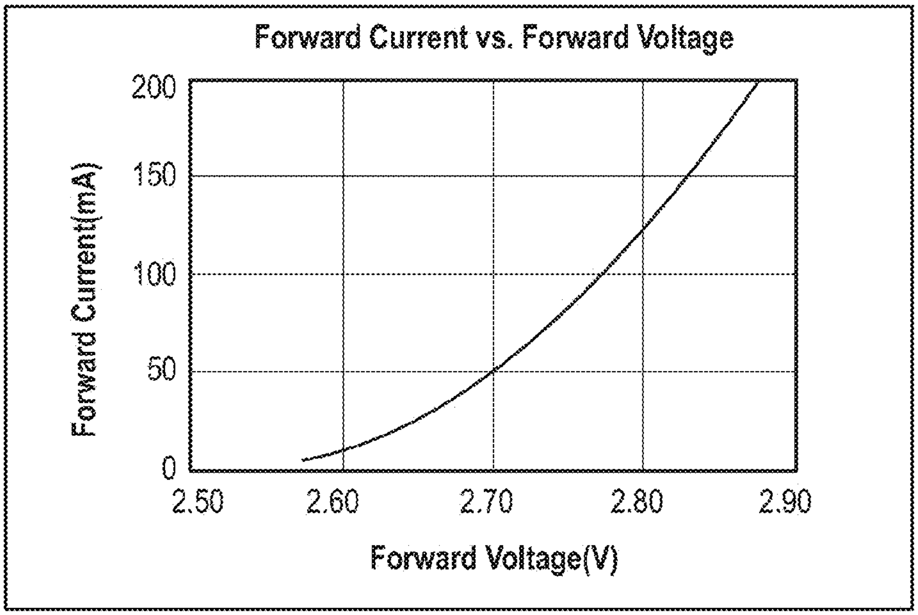
Figure 3D:
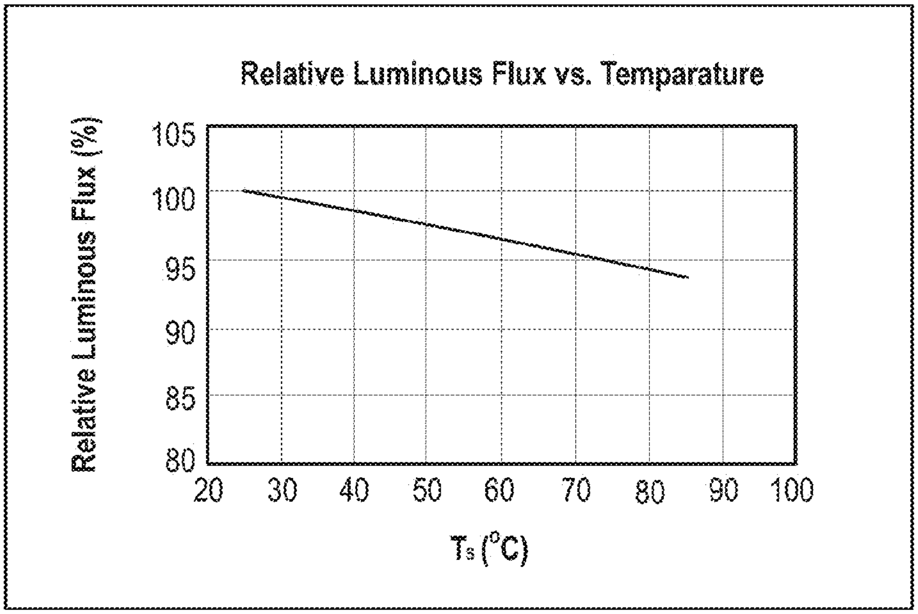
Figure 3E:
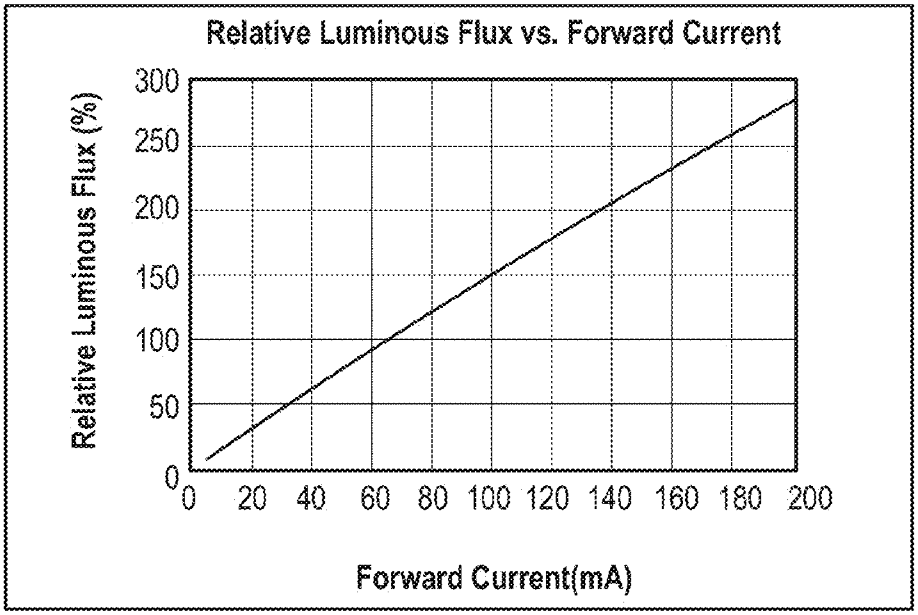
Figure 3F:
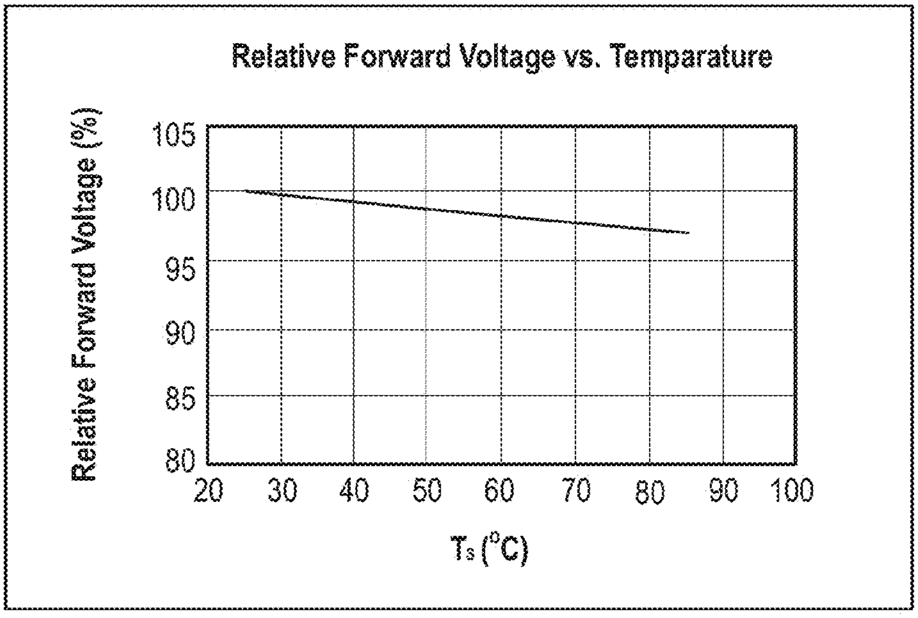

FIG. 1 depicts a hybrid net house and indoor farming system (plant factory or farm) 100 in accordance with the present invention, implemented in Abu Dhabi. FIG. 2 further shows various perspective views (back elevation, front elevation, cross section) of a net house 102, in accordance with the present invention. Table 1 lists examples of various settings programmed for or done on a net house or its components such as an air conditioning system, an absorption module and an adsorption module, in accordance with the present invention.

TABLE 1

| Net house |
|---|
| Temperature set point for fogging: 29° C.<br>Relative humidity set point: 75%<br>Min air temperature for fogging: 15° C.<br>Min fogging duration: 20 s<br>Max fogging duration: 30 s<br>Min pause between 2 fogging cycles: 300 s<br>Start fogging at 10:00 a.m<br>Stop fogging at 17:00 p.m |

Table 2 displays the energy requirements for a hybrid net house-indoor farming system.

TABLE 2

| | kWh/ Per SqM | for a single module 10240 $m^2$ | for 8 modules kWh |
|---|---|---|---|
| Electrical | 485 | 4,966,400 | 39,731,200 |
| Nutrient Solution | 50 | 512,000 | 4,096,000 |

TABLE 2-continued

| | kWh/ Per SqM | for a single module 10240 $m^2$ | for 8 modules kWh |
|---|---|---|---|
| Sensible Cooling | 200 | 2,048,000 | 16,384,000 |
| Dehumidification | 370 | 3,788,800 | 30,310,400 |
| Total | | 11,315,200 | 90,521,600 |

Table 3 shows photovoltaic and thermal production capacity of a hybrid net house-indoor farming system.

TABLE 3

| | Plant Factory | Net house | Total |
|---|---|---|---|
| Rooftop Area SqM | 21,780 | 54,450 | |
| Yearly GHI | 2,200 | 2,200 | |
| Photovoltaic Efficiency | 21% | 21% | |
| Thermal Efficiency | 66% | 0% | |
| Coverage | 100% | 85% | |
| Photovoltaic Conversion Efficiency | 90% | 90% | |
| Photovoltaic Production | 9,056,124 | 19,244,264 | 28,300,388 |
| Thermal Conversion Efficiency | 70% | 60% | |
| Thermal Production | 22,137,192 | 0 | 22,137,192 |

Table 4 displays the production capacity and productivity for leafy greens being grown in a hybrid net house-indoor farming system.

TABLE 4

| | Plant Factory | Net house | Total |
|---|---|---|---|
| Farm Area SqM | 81,960 | 43,560 | |
| Required Electricity | 39,731,200 | 0 | |
| Available Electricity | 28,300,388 | 0 | |
| Production Capacity Usage | 71% | 100% | |
| Productivity g/SqM | 350 | 220 | |
| Daily Production Kg | 20,433 | 9,583 | 30,016 |
| Yearly Production Kg | 7,458,020 | 3,497,868 | 10,955,888 |

The solar panels 104 used on the net house roofs are photovoltaic/thermal cogeneration flat panels. Each of the said panels comprise layers of tempered glass, a photovoltaic (PV) module, a heat conducting sheet and pipe, in addition to an insulation layer and an alloy frame. In an embodiment of the present invention, the PV module (possessing a negative temperature effect) 104 in accordance with the present invention absorbs the heat energy generated on the panel, and increases overall power generation capacity of the panel. Simultaneously, a portion of the generated heat energy is transported via pipes and stored in tanks to produce hot water for the indoor farming system and the plurality of PV panels generate energy, in the form of electricity and solar heat, which are supplied to the indoor farming system. Advantages of the solar panels used on the net houses include enabling approximately 88% harvesting of solar energy, 22% of solar electricity and 66% of solar heat. Further, the said panels increase PV efficiency by cooling the panel. Other perks include 25-30 years' service life, minimal maintenance requirements and being extremely inexpensive to operate.

In another embodiment, the panels 104 on the net house rooftops are shingle type connections (reliable connections), wherein the closed junctions in between the panels increase the effective area of shining light. Ribbons (flexible glue ribbons) are welded and connected from a top to a bottom portion of each of the individual cells, which are cut into individual slices (and shingled). An advantage of such a connection is flexibility and durability of the solar cell arrays (avoid cracks for a considerable duration of time). Considering the case with traditionally implemented solar panels, one of the main reasons these start losing efficiency is lack of durability, and another reason being that each individual solar cell (silicon-based) provide 0.5-0.6V each, and hence to reach a required voltage numerous such cells need to be placed back to back. The main risk encountered in such situations is shading. When a single panel is partially shaded, this leads to the entire panel being shut down owing to a diode, which was cut automatically. This is because if a panel is shaded partially, it becomes a hot spot rather than becoming cold-until it burns out. Hence, if you have a dead point, the system needs to be shortcut. Such drawbacks are eliminated through use of shingled connections. FIG. 3 (A-F) shows electrical properties of the PV panels and the LED lights (the IV curve, forward current characteristics and temperature characteristics), in accordance with the present invention.

The panels 104 are in connection with the LED grow lights needed in an indoor or vertical farming arrangement 106. PV panels 104 are moved to lay flat on the rooftops, in order to capture every bit of available solar rays, and the resulting solar energy is split to be used for powering the LEDs in buildings or constructions like the net houses, or the indoor farming systems, as well as to warm the interior of the building. In this way wastage of the available minimum amount of incident solar rays is also avoided. The only loss factor is soiling which can be optimized through daily cleaning with waterless system or dry robotic brushes. Also, the arrangement of the PV panels 104 on rooftops enables maximum protection during adverse climates, and the flexibility and ease of tilting the panels makes it easier to brush off any accumulated dust or impurities from the panels.

Figure 4A:
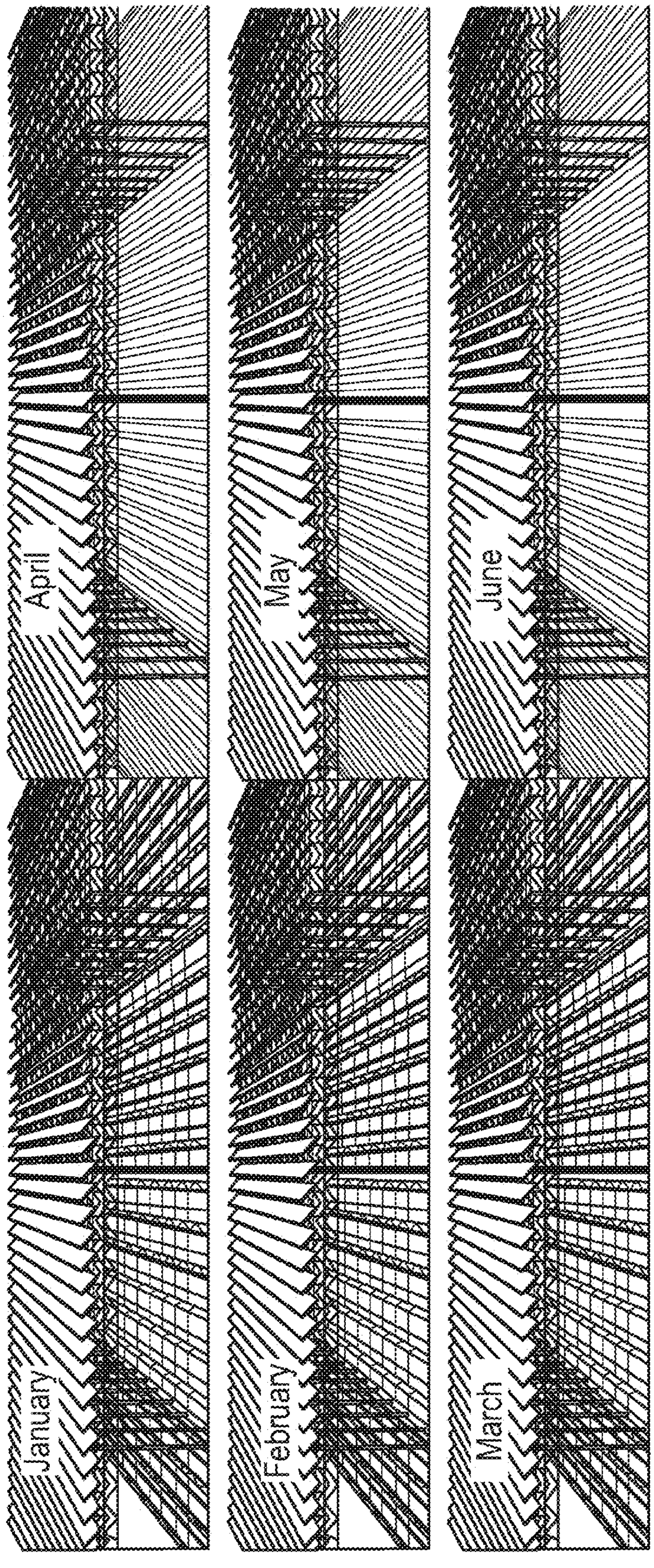
FIG. 4 depicts programming the PV panels 104 to be tilted or positioned at a particular angle (instead of being placed flat on the roofs) in accordance with various months of the year.
Figure 4B:
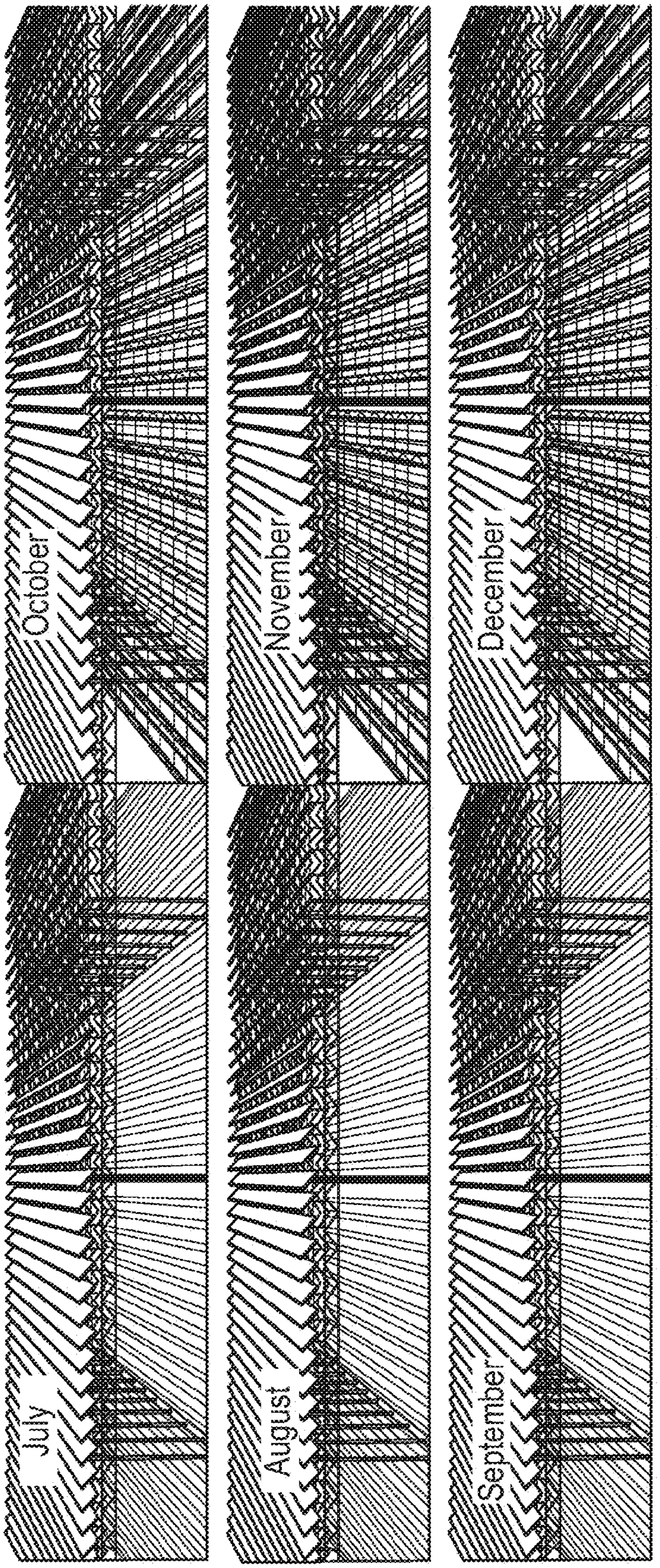

Methods implemented for optimizing solar photovoltaic and thermal productivity of the net house 102 rooftop include programming the PV panels 104 to be tilted or positioned at a particular angle (instead of being placed flat on the roofs) in accordance with various months of the year, as depicted in FIG. 4. Advantages resulting from the adaptably tiltable PV panels include obtaining full control over the panel angle at all times and seasons, optimize outputs for net house DLI, plant factory DLI or optimum distribution for both, maximum electricity production, capability to completely close the rooftops at night to keep the plant canopy warm in cool climates/nights, easier to brush off dust from slanted panels and allowing for maximum protection during storms or other adverse weather conditions. Table 5 displays optimum DLI values achieved through the PV panels installed on the net houses (Solar Photovoltaic and Thermal Productivity), in accordance with the present invention (for example, in Abu Dhabi).

TABLE 5

| | Available DLI | Panel Shading | Nethouse Losses | Available DLI2 | Target DLI |
|---|---|---|---|---|---|
| January | 34.20 | 12% | 15% | 25.58 | 24.00 |
| February | 40.00 | 30% | 15% | 23.80 | 24.00 |
| March | 47.40 | 50% | 15% | 20.15 | 24.00 |
| April | 53.60 | 62% | 15% | 17.31 | 24.00 |
| May | 56.90 | 75% | 15% | 12.09 | 24.00 |
| June | 57.80 | 80% | 15% | 9.83 | 24.00 |
| July | 57.20 | 75% | 15% | 12.16 | 24.00 |
| August | 54.60 | 66% | 15% | 15.78 | 24.00 |
| September | 49.40 | 42% | 15% | 24.35 | 24.00 |

TABLE 5-continued

| | Available DLI | Panel Shading | Nethouse Losses | Available DLI2 | Target DLI |
|---|---|---|---|---|---|
| October | 42.20 | 30% | 15% | 25.11 | 24.00 |
| November | 35.50 | 20% | 15% | 24.14 | 24.00 |
| December | 32.30 | 7% | 15% | 25.53 | 24.00 |

Figure 5:
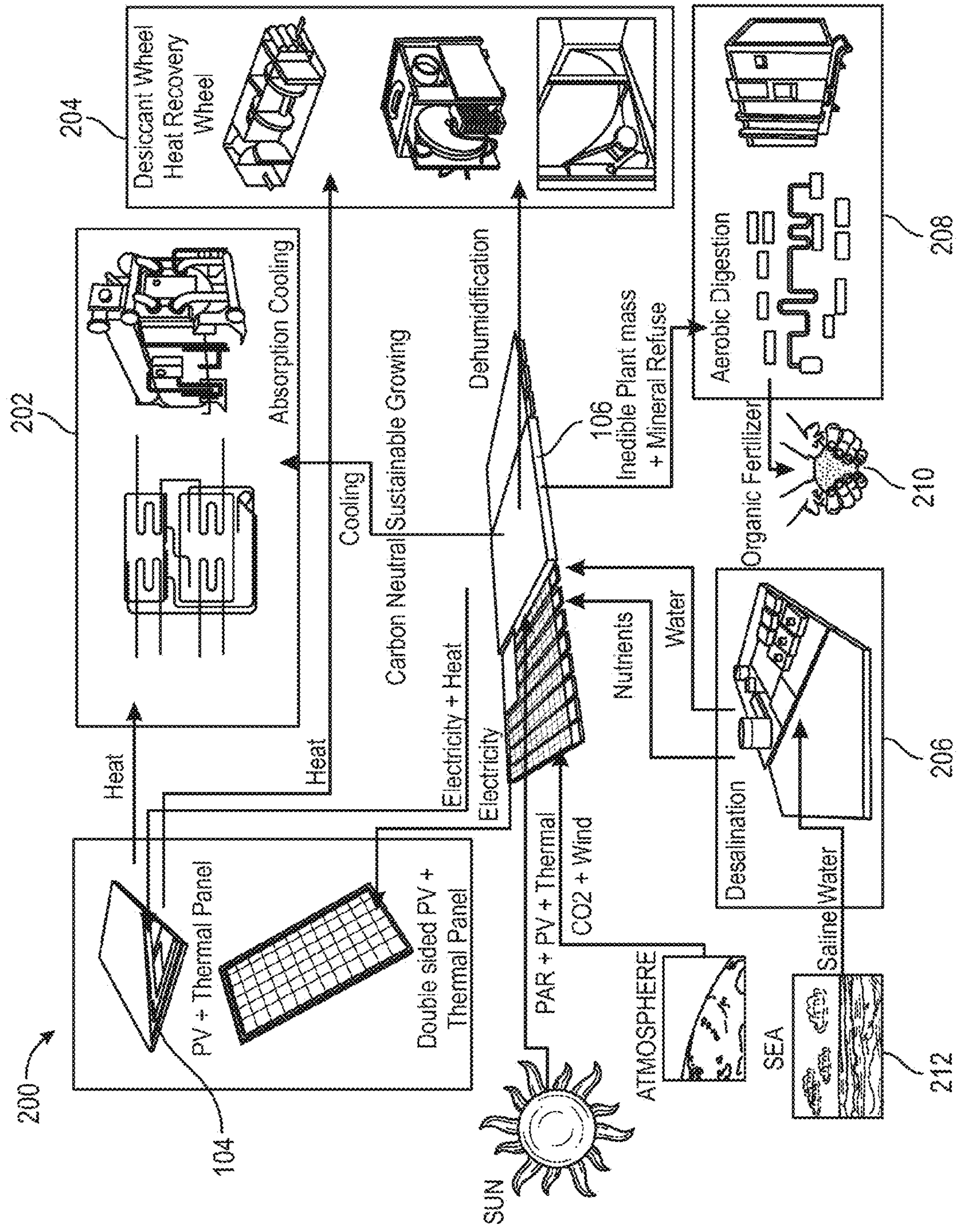
FIG. 5 is a block diagram showing a carbon neutral sustainable growing system, in accordance with another aspect of the present invention.

In accordance with another aspect of the present invention and as depicted in the block diagram of FIG. 5—a carbon neutral sustainable growing system 200 is disclosed comprising components such as an absorption module 202, an adsorption module 204, a desalination module 206 and an aerobic digestion module 208, with an objective to achieve an environment friendly/carbon neutral growth system resulting in high yield. The absorption module 202 requires heat as input, which is received from the photovoltaic and thermal panels (obtained from the sun) 104, and as output releases cooling water or chilled water, thereby cooling down or air conditioning of the indoor or vertical farming system 106. Absorption cooling occurs as a single stage and the main components of the absorption module 202 include a generator, a condenser, an evaporator and an absorber. This absorption module has minimum to zero electricity requirements. There are two main compartments in the absorption module 202, namely a high pressure compartment and a low pressure compartment. The refrigerant used in this absorption chiller 202 is lithium bromide and water (in a ratio of 50% to 40% approximately). The heat medium in this case are the PV panels 104. The condensor component comprises cooling pipes and water vapor exists in the high pressure and low pressure compartments. In an embodiment of the present invention, the absorption module 202 may be in connection with a cooling tower 203.

The adsorption module 204 mainly comprises a desiccant wheel/dehumidifier 205*a* and a heat transfer wheel 205*b* for heat exchange. The desiccant wheel 205*a* is made of a polymer-based material, and functions to output humidity from the indoor farming system 106. This module 204 also receives heat from photovoltaic and thermal panels (obtained from the sun) 104—as input, and as output dehumidifies the indoor or vertical farming system 106. In contrast to a traditional condensation process, the adsorption module 204 in accordance with the present invention allows for humidity from air to be extracted and released outside. Subsequently, dry air (dehumidified air) is the output of the adsorption module 204. Thereby no additional power/electricity is needed to further process the extracted humidity. A heat recovery wheel 205*b* is then used for necessary heat exchange. Air taken in by the adsorption module 204 is taken through the dehumidification sector of a rotating desiccant wheel coated with a sorption agent (hygroscopic) on which the moisture from the air deposits. An example of the sorption agent is silica. The dry air (dehumidified since the moisture is taken up by the desiccant and released outside) is then blown out into the room again. The regeneration air is then refed to a heating element in the circuit to take up new moisture.

In accordance with the present invention, no additional component is needed to provide inputs to the absorption or adsorption modules (202 and 204) of the currently proposed carbon neutral sustainable growing system 200. Both these modules require heat as input which is readily available and provided via the PV panels 104 positioned on the indoor farming building 106, or on nethouse 102 rooftops (the net houses being in direct contact with the indoor farming system). Also, outputs of each of the absorption module (chilled water), as well as the adsorption module (dehumidified air) are utilized completely in the indoor farming environment 106 and result in zero waste of resources or energy.

The proposed sustainable growth system 200 is further in combination with a desalination module 206 and an aerobic digestion module 208, to achieve a carbon neutral growth system with high yield and for producing nutrient rich fertilizer 210. Accordingly, a supply of seawater 212 is allowed towards the sustainable growth system and the farming system 200 (net houses 102 with solar panels 104, in combination with an indoor or vertical farming system 106) will not need any external energy source for its operation. The proposed system enables plants or crops being cultivated, to have access to a plurality of rich nutrients and/or minerals, and the by-product or waste product from the farming system is used as input to an aerobic digestion system 208. The desalination module 206 receives seawater 212 as input, and works to desalinate the water. As a by-product of the desalination process, a plurality of minerals and nutrients are also obtained (in addition to the extracted salt). The extracted plurality of minerals and nutrients are fed directly to the growth system, as replenishment to the plants or crops being grown. The growth system generally outputs inedible plant mass as well as mineral refuse, which in traditional systems is thrown out and wasted. However, in the present invention this inedible plant mass and mineral refuse is fed directly to an aerobic digestion module, which functions to produce organic fertilizer 210, wherein a regular input of the by-product or the waste products allows the aerobic digestion module to produce organic fertilizer every 24 hours (in contrast to the number of days taken traditionally). The produced organic fertilizer 210 is then mixed with sand (desert sand) in the right proportions, to produce nutrient rich soil. Brine (or water strongly impregnated with salt) is harvested, instead of being dumped back into the sea.

In an embodiment of the present invention, the aerobic digestion module 208 also receives food waste in addition to the inedible plant mass and mineral refuse obtained as by-products of the desalination module 206 and the sustainable growth system 200. A crusher component crushes the food waste into smaller pieces, and the crushed food waste then passes through a water-solid separator, wherein the solids move towards a composting tank, and the liquids move towards an oil separator. The oil separator then outputs waste oil (which is collected and re-used) and waste water (which is treated in a water treating system, and re-used). In the composting tank, adjustment of the temperature and required bacteria is done, and stirring processes take place adding air in between if required-resulting in fertilizer being produced (along with waste gas). Unlike traditional composting systems, the present aerobic digestion module 208 functions 24 hours a day and is very efficient in producing the organic fertilizer 210 in 24 hours (instead of 3-6 months like that in traditional systems). Further, ratios and proportions of mixing the fertilizer varies based on the plant or crop being cultivated (for example, tomatoes or lettuces). In an embodiment, desert sand is mixed along with the compost or organic fertilizer 210, to form the organic soil for plants.

Figure 6:
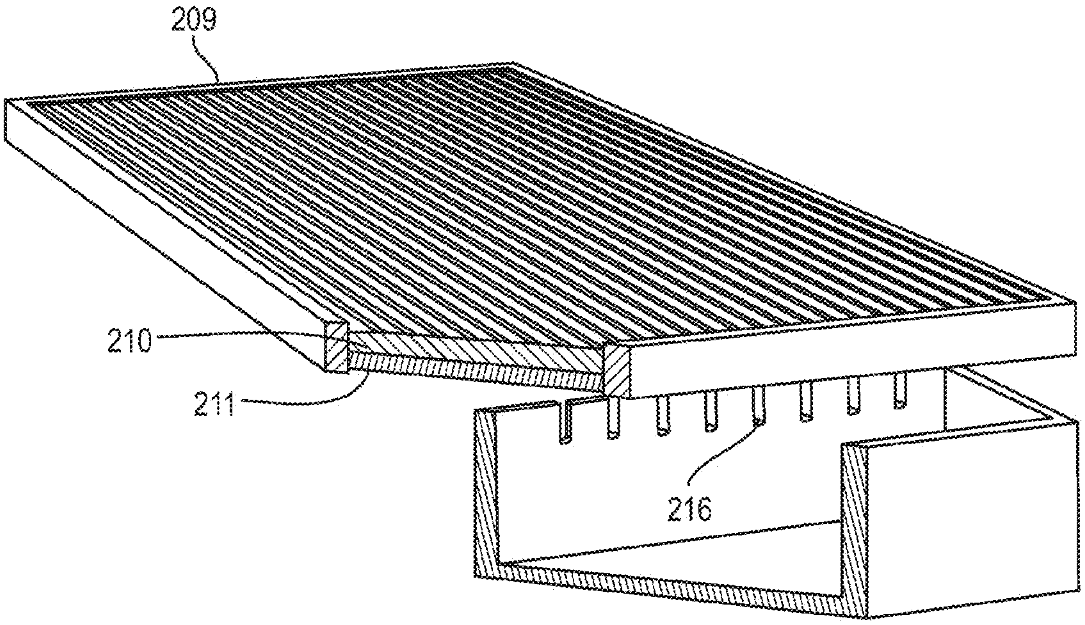
FIG. 6 depicts a cross section of a composting system, in accordance with the present invention.

In accordance with the present invention, the aerobic digestion module 208 is in connection with a crop cultivation area or farming platform, as shown in FIG. 6 (depicting a cross section of a composting system 209 in accordance with the present invention). A floating raft-like structure is present which has a geo-textile layer 211 which is used for holding water (rather than leaking away), and an organic fertilizer layer 214 is placed on top of this geo-textile layer. A concrete structure surrounds the composting system layers, and a plurality of irrigation pipes 216 are present at a base portion of the concrete structure, which function as drainage pipes, to drain away excess liquids from the composting system. Outputs of each of the desalination module (desalinated water), as well as the aerobic digestion module (organic fertilizer 210) are utilized completely in the indoor farming environment and result in zero waste of resources or energy.

Figure 7A:
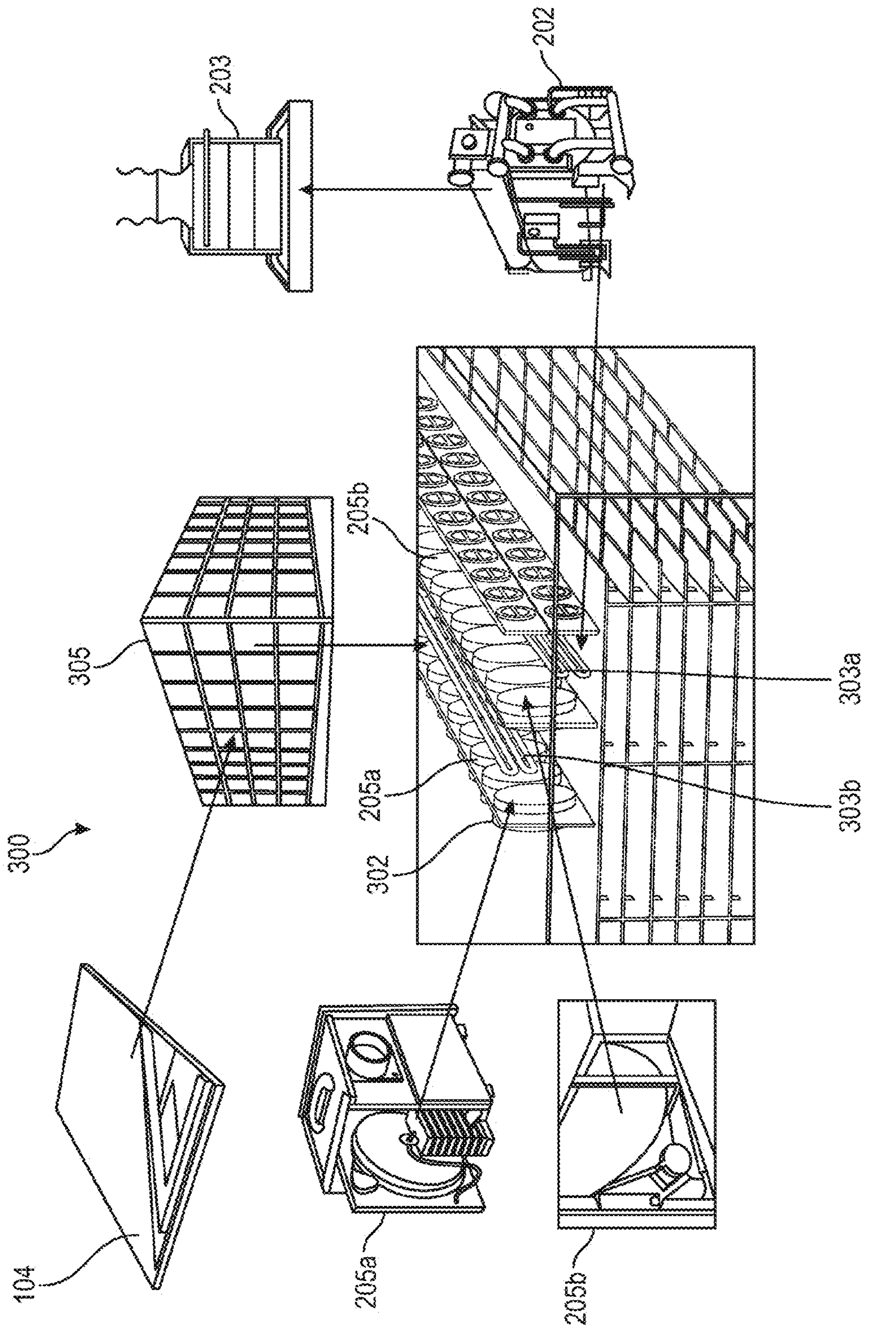
FIG. 7A and FIG. 7B show a ductless heating, ventilation, and air conditioning (HVAC) system for sustainable farming, in accordance with the present invention.
Figure 7B:
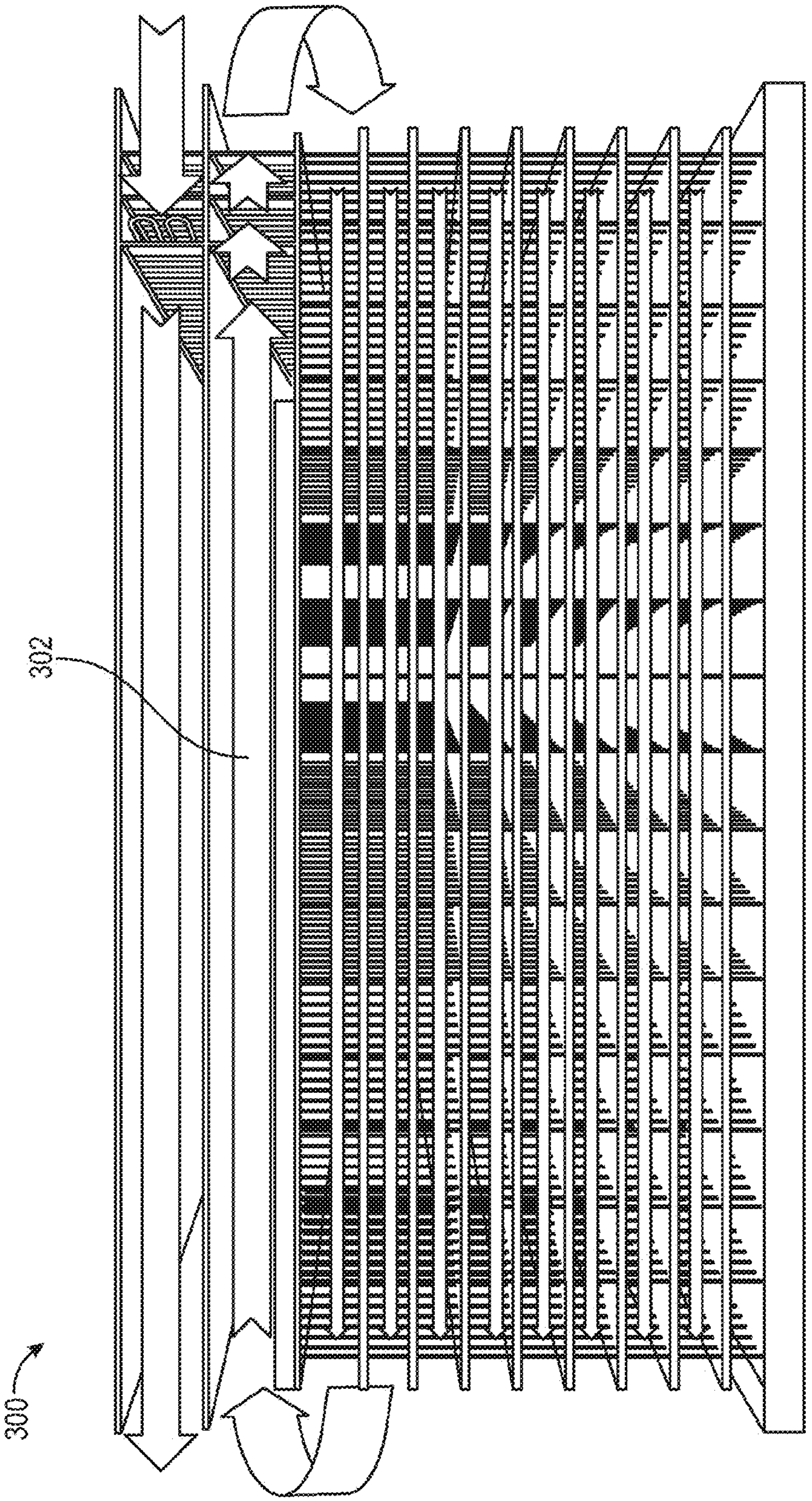

As another aspect of the present invention, and as shown in the block diagram of FIG. 7A and FIG. 7B, a ductless heating, ventilation, and air conditioning (HVAC) system 300 for sustainable farming is proposed, with an objective to achieve high yield. The ductless HVAC system 300 is used for dehumidification and cooling of the air being circulated through the indoor or vertical farming system 106, and is in connection with the absorption module 202 and adsorption module 204 of the proposed carbon neutral sustainable growing system. The proposed system eliminates the need for an additional power/electricity requirement, for running the sustainable growth system. Additionally, by-products or output of each module in the system is used as input for another module in the system, thereby resulting in minimum to zero losses, and high electric efficiency. The proposed HVAC system 300 is positioned in the false ceiling (concealed inside an upper layer of wooden planks) 302 of the indoor or vertical farming building/construction, and each vertical shelf in the farming system has at least one HVAC unit (or circulation system) positioned above it. The HVAC system 300 includes a first set of wheels (the dessicant wheel or de-humidifier wheel) 205*a* for dehumidification, and a second set of wheels 205*b* for heat transfer (heat transfer wheel or heat exchange wheel). There is minimal pressure drop throughout the functioning HVAC system at all times. Cold water is circulated through the proposed ductless HVAC system via a first set of pipes 303*a* (cooling pipes directly in connection with the absorption module or absorption chiller 202), and hot water is circulated through the HVAC system via a second set of pipes 303*b* (pipes being directly in connection with a hot water storage tank 305).

The PV panels 104 positioned on rooftops of net houses 102 assist to produce required hot water and electricity (which is a basic requirement for the HVAC system). The hot water produced is stored in large tanks such as a hot water storage tank 305. This stored hot water is circulated through the second set of pipes 303*b* in order to further heat external air used to dehumidify the dessicant wheel or de-humidifier wheel 205*a*. There are also a plurality of fans which rotate in all directions. The area in between the PV or solar panels on the rooftop and the false ceiling 302 of the indoor farming building or system is host to the ductless HVAC system 300 and acts also a heat regeneration space for the system. The false ceiling 302 has no ducting. The ductless air conditioning system is positioned within a false ceiling portion of the indoor farming arrangement, which functions as a duct for the air conditioning system. The proposed HVAC system 300 implements a dessicant wheel 205*a* and heat recovery wheel 205*b* for each shelf of the indoor farming system 106. Optimum performance is achievable when operating the proposed HVAC system in areas with hot climates, wherein heat may be recovered from the heated air coming from outside, however during nighttime when the external air is cooler, the load on the absorption chillers is reduced substantially. As shown in FIG. 7B, the space between the PV panels and roof and the false sealing, is the heat regeneration area, through which there is constant air flow to continuously allow for any additional heat to be released outside.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims, which follow.

The invention claimed is:

1. A sustainable growing system (200) for plants, comprising: (i) a net house (102) at least partially covered by a plurality of photovoltaic-thermal panels (104) configured to output, from incident solar energy, both electricity and thermal heat; (ii) an absorption module (202) configured for cooling an atmosphere of the sustainable growing system and thermally coupled to the photovoltaic-thermal panels (104) to receive said thermal heat as a driving input, the absorption module (202) having a chilled-water output line directed to the atmosphere of the sustainable growing system; (iii) an adsorption module (204) configured for dehumidifying the atmosphere of the sustainable growing system and thermally coupled to the photovoltaic-thermal panels (104) to receive said thermal heat as a driving input, the adsorption module (204) having a dehumidified-air output line directed to the atmosphere of the sustainable growing system; (iv) a desalination module (206) coupled to a seawater input (212) and configured to output desalinated water and a stream of minerals/nutrients to the sustainable growing system; and (v) an aerobic digestion module (208) configured to receive by-products from the sustainable growing system, including at least one of inedible plant mass, mineral refuse and food waste, and to output organic fertilizer (210) within a 24-hour digestion cycle; wherein outputs of the absorption module (202), the adsorption module (204), the desalination module (206) and the aerobic digestion module (208) are each utilized within the sustainable growing system, and wherein said by-products from the sustainable growing system are supplied as an input to the aerobic digestion module (208), thereby resulting in zero waste of resources or energy.

2. The sustainable growing system of claim 1, wherein the absorption module (202) is single-effect absorption chiller comprising only one generator, said only one generator being thermally coupled to the photovoltaic-thermal panels (104).

3. The sustainable growing system of claim 2, wherein the single-effect absorption chiller further comprises a condenser, an evaporator and an absorber arranged in fluid communication with said only one generator.

4. The sustainable growing system of claim 3, further comprising a cooling tower (203) coupled to said condenser of the single-effect absorption chiller.

5. The sustainable growing system of claim 2, wherein a refrigerant of the single-effect absorption chiller is a mix of lithium bromide and water.

6. The sustainable growing system of claim 1, wherein the absorption module (202) further comprises a high-pressure compartment and a low-pressure compartment, and a refrigerant configured to flow between said high-pressure compartment and said low-pressure compartment under the thermal driving input from the photovoltaic-thermal panels (104), and wherein the absorption module (202) is configured to operate with minimum or zero electrical input, said thermal coupling between the absorption module (202) and the photovoltaic-thermal panels (104) being the sole driving input to the absorption module (202).

7. The sustainable growing system of claim 1, wherein the adsorption module (204) comprises a rotating desiccant dehumidifier wheel (205*a*) and a heat transfer wheel (205*b*), the desiccant dehumidifier wheel (205*a*) and the heat transfer wheel (205*b*) being mounted in series along an air flow path of the adsorption module (204).

8. The sustainable growing system of claim 7, wherein the rotating desiccant dehumidifier wheel (205*a*) is formed of a polymer-based substrate.

9. The sustainable growing system of claim 7, wherein the rotating desiccant dehumidifier wheel (205*a*) is coated with a sorption agent configured to deposit thereon, in operation, moisture from the atmosphere of the sustainable growing system (200).

10. The sustainable growing system of claim 9, wherein the sorption agent comprises a hygroscopic agent, said hygroscopic agent being silica.

11. The sustainable growing system of claim 7, wherein the adsorption module (204) further comprises a regeneration heating element thermally coupled to receive said thermal heat from the photovoltaic-thermal panels (104), said regeneration heating element configured to recondition the rotating desiccant dehumidifier wheel (205*a*) for subsequent moisture absorption, and wherein the adsorption module (204) is configured to operate without further electrical input for processing moisture extracted from the atmosphere of the sustainable growing system (200) by the rotating desiccant dehumidifier wheel (205*a*).

12. The sustainable growing system of claim 11, wherein the adsorption module (204) further comprises a humid-air exhaust line configured to discharge said moisture extracted from the atmosphere of the sustainable growing system (200) outside of the sustainable growing system (200) without further reprocessing.

13. The sustainable growing system of claim 1, further comprising a ductless heating, ventilation and air conditioning system (300) positioned in a false ceiling (302) of a building of the sustainable growing system and in operative communication with the absorption module (202) and the adsorption module (204), the ductless HVAC system (300) configured to receive chilled water from the absorption module (202) and dehumidified air from the adsorption module (204) and to circulate said chilled water and said dehumidified air into the atmosphere of the sustainable growing system (200).

* * * * *